(12) United States Patent
Lambert et al.

(10) Patent No.: US 7,832,116 B2
(45) Date of Patent: Nov. 16, 2010

(54) SYSTEM AND METHOD FOR MAKING FOOTWEAR WITH INJECTED COLOR

(75) Inventors: William Paul Lambert, Topeka, KS (US); Oliver Ma, Taipei (CN); Otto Ting, Taipei (CN); Patrick Liao, Taipei (CN)

(73) Assignee: Payless ShoeSource Worldwide, Inc., Topeka, KS (US)

( * ) Notice: Subject to any disclaimer, the term of this patent is extended or adjusted under 35 U.S.C. 154(b) by 288 days.

(21) Appl. No.: 11/393,458

(22) Filed: Mar. 29, 2006

(65) Prior Publication Data

US 2007/0234591 A1    Oct. 11, 2007

(51) Int. Cl.
    *A43B 1/02*    (2006.01)
(52) U.S. Cl. .............................. 36/11.5; 36/84; 12/142 R
(58) Field of Classification Search .................. 36/84, 36/87, 4, 11.5; 12/142 R
    See application file for complete search history.

(56) References Cited

U.S. PATENT DOCUMENTS

| | | | | |
|---|---|---|---|---|
| 2,093,908 A | * | 9/1937 | Dodge | 36/11.5 |
| 3,345,763 A | * | 10/1967 | Rollman | 36/14 |
| 3,376,608 A | * | 4/1968 | Wilcox | 425/119 |
| 3,474,496 A | * | 10/1969 | Klee | 425/119 |
| 3,854,227 A | * | 12/1974 | Borisuck et al. | 36/4 |
| 3,915,608 A | * | 10/1975 | Hujik | 425/119 |
| 3,962,387 A | | 6/1976 | Hendry | |
| RE29,265 E | | 6/1977 | Hendry | |
| 4,165,958 A | * | 8/1979 | Malburg et al. | 425/119 |
| 4,888,887 A | * | 12/1989 | Solow | 36/3 R |
| 5,814,254 A | * | 9/1998 | Bisconti | 264/46.4 |
| 5,998,006 A | * | 12/1999 | Bambara et al. | 428/304.4 |
| 6,061,929 A | * | 5/2000 | Ritter | 36/107 |
| 6,439,536 B1 | | 8/2002 | Piccolo | |
| D473,040 S | | 4/2003 | Hawker et al. | |
| 6,558,784 B1 | * | 5/2003 | Norton et al. | 428/304.4 |
| D476,797 S | | 7/2003 | Schenone | |
| D479,906 S | | 9/2003 | Hawker et al. | |
| 6,864,033 B2 | | 3/2005 | Nakamura et al. | |
| D509,950 S | | 9/2005 | Adams et al. | |
| 6,993,858 B2 | | 2/2006 | Seamans | |
| D517,788 S | | 3/2006 | Seamans | |
| D517,789 S | | 3/2006 | Seamans | |
| D517,790 S | | 3/2006 | Seamans | |
| D525,419 S | | 7/2006 | Seamans | |
| 7,146,751 B2 | | 12/2006 | Seamans | |
| D535,088 S | | 1/2007 | Seamans | |
| 2002/0116843 A1 | * | 8/2002 | Harrison | 36/84 |
| 2002/0188032 A1 | * | 12/2002 | Tolen et al. | 521/82 |
| 2003/0001310 A1 | * | 1/2003 | Masterson et al. | 264/250 |
| 2003/0009909 A1 | | 1/2003 | Chen | |
| 2004/0231189 A1 | * | 11/2004 | Seamans | 36/3 A |
| 2004/0231190 A1 | | 11/2004 | Seamans | |
| 2004/0231191 A1 | * | 11/2004 | Seamans | 36/11.5 |

(Continued)

FOREIGN PATENT DOCUMENTS

EP    0002311 A2    6/1979

*Primary Examiner*—Marie Patterson
(74) *Attorney, Agent, or Firm*—Lathrop & Gage LLP

(57) ABSTRACT

A footwear piece with two or more injected colors is disclosed. The footwear is made by injecting raw materials of two or more different colors into a mold and causing the different colors to spread randomly throughout the base section of the footwear.

9 Claims, 3 Drawing Sheets

U.S. PATENT DOCUMENTS

2004/0261297 A1* 12/2004 Park .............................. 36/87
2006/0048407 A1 3/2006 Seamans
2006/0112599 A1* 6/2006 Braynock et al. ............. 36/137
2007/0130797 A1* 6/2007 Seamans ..................... 36/11.5

* cited by examiner

SYSTEM AND METHOD FOR MAKING FOOTWEAR WITH INJECTED COLOR

BACKGROUND

I. Field of the Invention

The present invention relates to footwear made of synthetic resin materials. More particularly, the present invention relates to a system and method that is used to make multi-color footwear by combining resins of different color to produce a pattern of different colors in the footwear.

II. Description of the Related Art

Footwear made from light-weight materials such as closed cell resin have gained popularity in recent years. One of the methods to manufacture such footwear is molding where resin is injected into a mold. The resin solidifies and assumes the permanent shape of a footwear. the temperature decreases in the mold. U.S. Reissue Patent Re. 29,265 and U.S. Pat. No. 3,962,387 both issued to Hendry and incorporated by reference herein describe a closed cell foam plastic molding machine for molding articles made of closed cell foam plastic. The Hendry patents describe extrusion equipment for injection molding of granular thermoplastic materials to make foam products. The foam is provided by mixing an inert gas, such as nitrogen, into molten thermoplastic material. Multiple molds may be used with a given injection machine to facilitate rapid processing with extended cooling times for the individual molds.

U.S. Pat. No. 6,439,536 issued to Piccolo is incorporated herein by reference and describes the special problem of molding shoes with expanding plastic materials. A two piece undercut mold with a one piece core define a mold cavity that is fed through filing channels. Expanding plastics, and particularly ethylene vinyl acetate (EVA), may expand from 20% to 80% by volume upon the opening of such molds, where it is desirable to open the molds quickly to avoid product deformation. Alternative plastics for use in these applications at least include polyurethane and PVC. Lateral through-holes may be formed in the shoe upper by the use of side inserts. The base section and the strap of a sectional footwear may be molded separately. The base section made by injection molding may expand in size when removed from the mold, but it usually shrinks as it cools down. U.S. Patent Application Publication # U.S. 2004/0231190 describes a particular coefficient of expansion that is generally desirable when molding EVA shoes. It also discloses a molding process in which the base section and the strap of the footwear are separately molded and then assembled together.

Prior to the present invention, shoes made by injection molding usually contain one primary color throughout the entire footwear. This simple color scheme may be due to the relative simplicity of plasticizing and injecting raw materials of a single color. However, footwear with multiple colors dispersed throughout the base section may be desirable because they are stylistically more attractive. Moreover, it may be productively advantageous to utilize raw materials of different colors. This advantage becomes more apparent when there is a shortage of raw material of a particular color.

No methodology has been disclosed for molding a shoe that contains two or more colors being dispersed throughout the entire footwear. There is therefore a need for a system and a method for making such multi-color footwear. All references cited in this disclosure are hereby incorporated by reference.

SUMMARY

The present disclosure provides a system and a method for making a footwear with a multi-color pattern dispersed throughout the footwear. A multiple injection process is disclosed wherein resins of different colors are injected sequentially or simultaneously into a mold. The footwear thus formed contains two or more colors that are dispersed at depth throughout the footwear and present a decorative surface pattern because the colors are incompletely mixed. The methods disclosed here may be used in making the footwear as a unitary component or as different components of a sectional footwear, such as the base section and the strap.

According to one embodiment, a mold is provided with a cavity that is configured to receive flowable plastic material and shape the same into a footwear component. A plurality of flowable plastic materials are provided in respective colors, for example, by extrusion processing equipment to render an EVA foam. These materials are introduced contemporaneously into the mold cavity with incomplete mixing, as may be done either by direct injection into the mold or through a header. The flowable plastic materials in the mold cavity are permitted to harden into a substantially non-flowable state, and this may be accelerated by cooling. The footwear component is subsequently removed from the mold and allowed to expand.

One object of this invention is to provide a system and a method to manufacture a footwear that is both light-weight and colorful. Another object is to provide a method for simultaneous injection of resins into the same mold. Yet another object of the invention is to provide a method that permits sequentially injected materials to mix in the mold and form a dispersed colored pattern.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
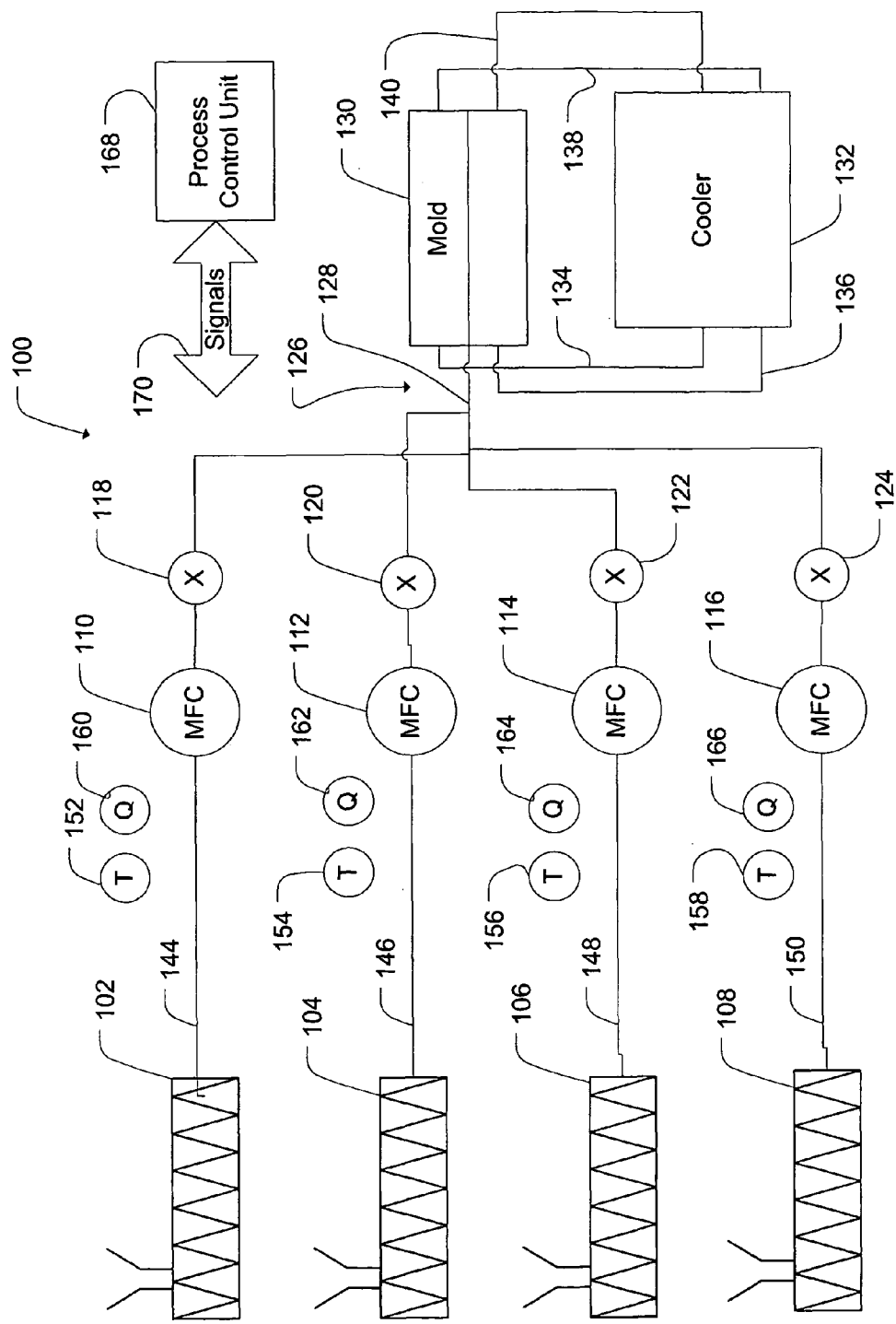
FIG. 1 is a schematic representation of the injection molding system.

There will now be shown and described an injection molding system for making a shoe with two or more colors. Raw materials of at least two different colors are injected into the mold. The mold may have one or more openings to receive the raw materials.

Materials

Raw materials for use in making the shoes include any resin that is in a flowable state, such as a thermoplastic melt or a chemically reactive casting resin as a liquid, gel or foam. These resins may be used in injection molding processes, spin casting processes, and other processes that use flowable resins. In one embodiment, the resin is ethylene vinyl acetate (EVA) copolymer based material. Preferably, additives are included with the EVA materials to create an expansible material.

Various formulations of ethylene copolymer plastics are well known in the art. One example of such formulations that has been used in undercut molds to make foam products is shown and described in EP0002311 to Gilbey, which is incorporated herein by reference. The Gilbey composition contains an ethylene copolymer resin mixed with from 0.2% to 6% by weight of a crosslinking agent, and this is more preferably from 1% to 4%. There is also 0.2% to 6%, and more preferably from 1% to 4%, by weight of a chemical foaming agent. Typical crosslinking agents used with these polyolefins include, for example, dicumyl peroxide, 1,3bis(tertiarybutylperoxyisopropyl)benzene and 2,5-dimethyl-2,5,-di(tertiary butylperoxy)hexyne-3. Typical chemical foaming agents used in these polyolefins include, for example, azodicarbonamide, p,p'-oxybis(benzenesulphonyl hydrazide) and other materials. The crosslinking agents may be used with such co-agents as triallyl cyanurate or activators including m-phenylenedimaleimide. The foaming agents may be used together with the usual formulation aids, such as oxides, hydroxides or soaps (especially stearates) of such alkaline or alkaline earth metals as magnesium or zinc. Generally the composition is injected into the mould under a pressure of from 1.7 to 70, which is preferably from 6.5 to 35 $MN/m^2$. Prior to the opening of the closed components of the mould, the composition in the mold is preferably heated to a temperature of from 150° C. to 210° C., and this is preferably from 170° C. to 190° C.

The polymer may be a homopolymer of ethylene and is usually made by a free radical initiated polymerization or it may be a copolymer. The preferred polymer is a co polymer of ethylene with up to 25% by weight of an unsaturated ester of a carboxylic acid, and this is more preferably from 5% to 20%. Especially preferred comonomers include vinyl acetate, methyl ethyl esters, or butyl esters of acrylic or methacrylic acids. Preferably the polymers have a melt flow index of from 0.5 to 50 (especially 1 to 10)g/10 minutes as measured according to British Standard 2782, part 1/105C/1976 using a 2.16 Kg load and carried out at 190° C.

The composition may also contain the usual fillers such as chalk, dolomite, barites, talc, clay, wood flour and slate flour, and the usual stabilizers such as antioxidants or light stabilizers, processing aids such stearic acid, pigments and plasticizers such as dioctyl phthalate.

EXAMPLE 1

Eva Copolymer Formulation

The following ingredients may be combined in an extrusion apparatus: (a) 95% by weight of a copolymer of ethylene including 18% by weight (based on the copolymer) of vinyl acetate and having a melt flow index of 2 g/10 minutes; (b) 1.8% by weight of dicumyl peroxide as a crosslinking agent; (c) 1.7% by weight of azod icarbonamide as a chemical foaming agent; (d) 0.75% by weight of zinc oxide to promote a more uniform decomposition of the foaming agent; and 0.75% by weight of stearic acid as a processing aid.

The composition is heated to 115° C. and injected into the mold having closed components which is hereinafter described with reference to the drawings. The mold is hot and is allowed to heat the composition to about 180° C., in order to activate the crosslinking agent and to decompose the chemical foaming agent liberating its nitrogen also at 180° C. The closed components of the mould resist expansion of the liberated nitrogen. After the composition has reached about 180° C., the mold is opened to facilitates expansion of the trapped nitrogen, causing composition to expand as a foam. In consequence of this expansion, the composition moves away from and clears the undercutting surface of the mold, permitting easy removal of the composition from the mold as a crosslinked foam from the mold.

Various coloring agents as are known in the art may be mixed with the composition of Example 1 to provide resins of different colors. A variety of plastics dyes and pigments to make virtually any color are available on commercial order from a number of manufacturers, for example, in an extensive assortment of colorants that is commercially available from BASF of Florham Park, N.J. under the Heliogen®, Lithol®; Paliogen®; Paliotol®; Sicomin®; Sicopal®; Sicotan®; Sicotrans®; Variocrom®; Color Variable Pigments™; Eupolen® PE; Eupolen®; Eupolen® PE; Eupolen® PP; Eupolen® PA; Euvinyl®; Oppasin® D; Lumogen® F; and Thermoplast/Thermoplast F products. The raw materials may be in liquid, granular or in powder form. For instance, compatible plastic beads, pigments, or dyes may be used to provide a color assortment. Preferably, the raw materials include those for at least two different batches of resins each of which is of a single color, and at least one batch is of a color that is different from the colors of other batches.

System

As shown in FIG. 1, a plurality of hopper-equipped screw extruders 102, 104, 106, 108 are each allocated to provide compositions of different colors, for example, as described above in Example 1. The extruders 102-108 are capable of screw action rendering granular plastics and co-agents into a molten mass of material for use in injection molding. In one embodiment, extruder 102 may provide a white composition, extruder 104 provides a red composition, extruder 106 provides a yellow composition, extruder 108 provides a green composition. There may be any number of such extruders individually injecting any color of the composition. Alternatively, one or more of what are shown as the extruders 102-108 may be a mixing vessel for a chemically reactive casting resin that is thermally activated. Alternatively, one or more of what are shown as the extruders 104-108 may be a supply reservoir and pump for injecting a coloring agent, such as a dye, for coloring a primary resin that is extruded from extruder 102.

As shown, each of the extruders 102-108 feeds a corresponding mass flow controller 110, 112, 114 or 116, each of which are set to allocate a predetermined flow rate of the composition from the corresponding one of the extruders. Valves 118, 120, 122, and 124 open and close to permit selective flow that feeds a header system 126 for discharging a combination of contents into feeder line 128. The feeder line 128 is used to fill a mold 130, which may be a two-part undercut mold with a one-piece core, as shown and described in U.S. Pat. No. 6,439,536. A cooler 132 circulates coolant through input lines 134, 136 and return lines 138, 140. A temperature sensor 142 may be used to provide sense signals for proper opening and closing of the mold 130.

It will be appreciated that the compositions from each of the extruders 102-108 may be provided or maintained at different temperatures. The thermoplastic resins may have different viscosities as a function of temperature, such that it is possible to implement a degree of process control over mixing within header 128 by controlling the upstream temperature, for example, in lines 144, 146, 148, and 150. To this end, temperature sensors 152, 154, 156, 158 provide sense signals from their respective one so lines 144-150, and heat exchangers 160, 162, 164, 166 are used to keep process temperatures within design limits by selective heating or cooling of the corresponding one of lines 144-150. Controlling temperature in this manner, or by adding a thickener to one or more of the compositions, permits process control to establish quite sharp color changes to the injected pattern, or to permit subtle blending of colors with a more gradual color change in the finished product. These effects are influenced also by the length of the header 128.

The system 100 may be automated for operation as described above by a process control unit 168, which is assembled from conventional components known to the art and may be a wireless digital controller for interaction with other system components previously described through signals 170, for example, in sending control instructions and receiving measurement or status signals. Alternatively, the system 100 may be operated by manual controls (not shown).

Figure 2:
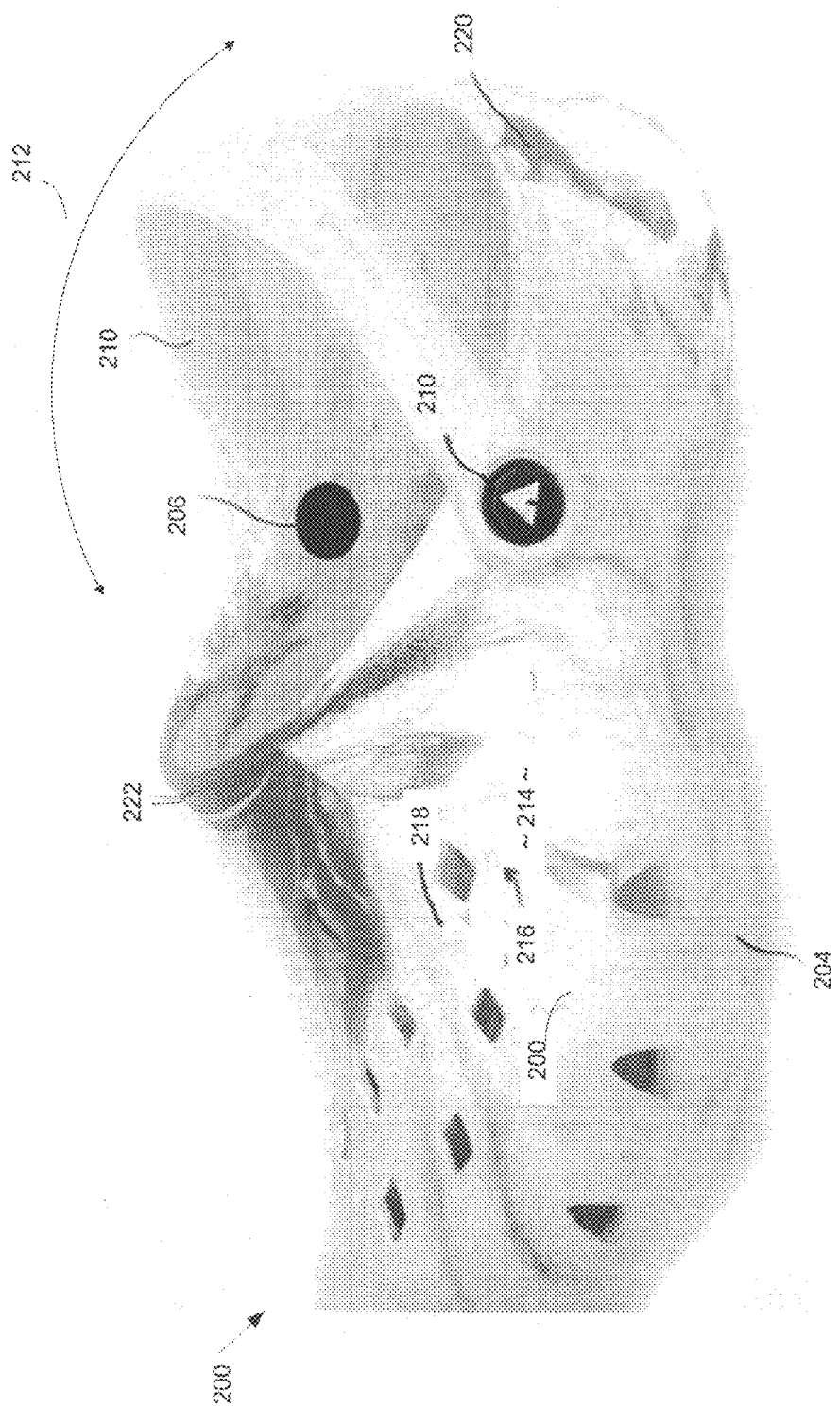
FIG. 2 is a perspective view of a shoe that is made by use of the system in FIG. 1.
Figure 3:
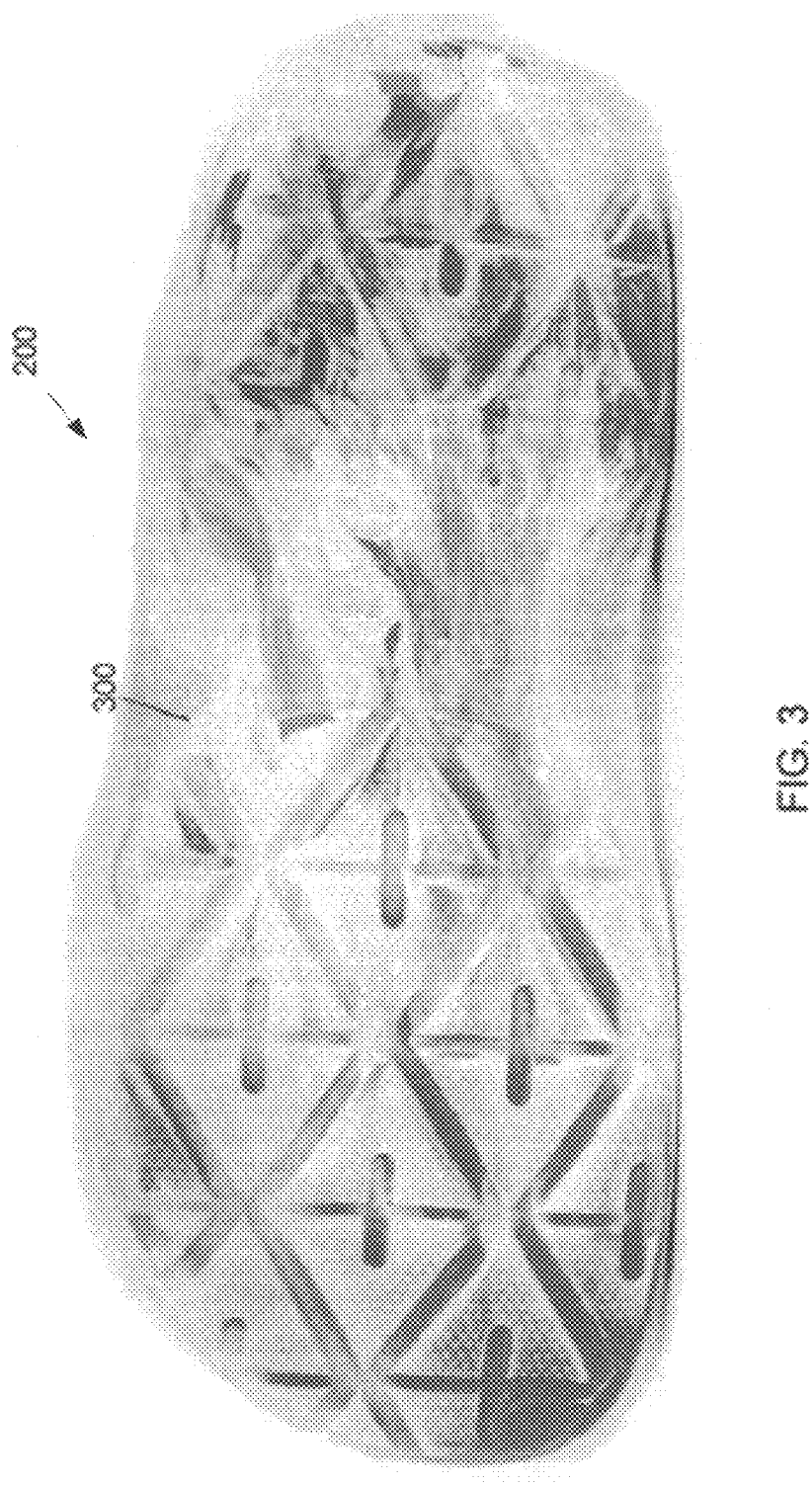
FIG. 3 is a bottom plan view of the shoe.

Processed as described above, the composition takes the shape of a shoe 200, as shown in FIG. 2. Shoe 200 is formed as a unitary molded piece having an upper 202 that may also be described as a vamp, and a lower 204 including the sole of the shoe 200. Rivets 206, 208 connect a pivoting strap 210 sufficiently to detain the strap 210 by frictional forces against the upper 202 in any selected pivot position along arc 212. The surface 214 of shoe 200 presents multiple colors, in this case including primarily a white composition 216 that is interspersed with yellow 218, green 220, and red 222. These colors are not merely surface feature of shoe 200, but extend transversely at depth into the walls of the shoe 200. FIG. 3 shows the sole 300 of shoe 200 where also a variegated color pattern is presented the incomplete mixing or dispersion of multiple resin types throughout the shoe 200.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

We claim:

1. A footwear product produced by a method comprising the steps of:
    providing a mold with a cavity configured to receive flowable plastic material and shape the same into a unitary footwear component having an upper and a lower;
    supplying a plurality of foaming resins in respective colors;
    contemporaneously introducing the plurality of foaming resins into the mold cavity at pressure for incomplete mixing of the color in combination at depth through at least one of the upper and lower;
    permitting the plurality of foaming resins in the mold cavity to harden into a substantially non-flowable state; and
    removing the footwear component from the mold to form a unitary molded shoe consisting essentially of the plurality of resins in a substantially non-flowable state expanded at least 20% with respect to the volume presented by the mold,
    the footwear product presenting an outer surface with an inhomogenously variegated color pattern extending depthwise from the outer surface into the at least one of the upper and lower.

2. The footwear product of claim 1, wherein each of the foaming resins is an ethylene vinyl acetate copolymer.

3. The shoe of claim 1 including a heel strap riveted to the shoe.

4. In a shoe consisting essentially of ethylene vinyl acetate (EVA) copolymer, the improvement comprising:
    a decorative pattern made by injection molding of a plurality of flowable foaming EVA materials at pressure with incomplete mixing of the materials to present a decorative variegated color pattern at depth through the shoe upon expansion of at least 20% by volume when the shoe is released from the mold,
    the shoe presenting an outer surface with an inhomogenously variegated color pattern extending depthwise from the outer surface into the shoe.

5. The shoe of claim 4 including a heel strap riveted to the shoe.

6. A shoe consisting essentially of:
    an upper and a lower formed as a unitary component made of a foaming resin material that is hardened from a flowable state,
    the foaming resin material in each of the upper and the lower including a plurality of individual foaming resins of respective colors that are mixed to an incomplete state to present a decorative variegated color pattern at depth through each of the upper and the lower,
    the shoe presenting an outer surface with an inhomogenously variegated color pattern extending depthwise from the outer surface into the shoe.

7. The shoe of claim 6, wherein the individual resins are each ethylene vinyl acetate resins.

8. The shoe of claim 6 including a heel strap riveted to the upper.

9. The shoe of claim 8, where the heel strap is made of plurality of individual resins of respective colors that are mixed to an incomplete state to present a decorative variegated color pattern at depth through the heel strap.

* * * * *